United States Patent
Talley et al.

(10) Patent No.: US 7,133,681 B1
(45) Date of Patent: Nov. 7, 2006

(54) METHOD AND SYSTEM OF POOLING CHANNEL ELEMENTS ON A SWITCH OR OMCR LEVEL

(75) Inventors: Ryan Talley, Olathe, KS (US); Abhijit Apte, Overland Park, KS (US); John Humbert, Overland Park, KS (US); Hector Ribas, Overland Park, KS (US); Meng Yew, Lenexa, KS (US); E. Michael Schafer, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 380 days.

(21) Appl. No.: 10/704,236

(22) Filed: Nov. 7, 2003

(51) Int. Cl.
*H04Q 7/20* (2006.01)

(52) U.S. Cl. .................... 455/450; 455/422.1; 455/561

(58) Field of Classification Search ................ 455/450, 455/451, 452.1, 452.2, 453, 561, 560
See application file for complete search history.

(56) References Cited

U.S. PATENT DOCUMENTS

| | | | |
|---|---|---|---|
| 5,504,939 A | | 4/1996 | Mayrand et al. |
| 5,574,775 A | * | 11/1996 | Miller et al. ................ 455/444 |
| 6,188,903 B1 | * | 2/2001 | Gardner et al. ............. 455/447 |
| 6,856,652 B1 | * | 2/2005 | West et al. .................. 375/260 |
| 2003/0050071 A1 | | 3/2003 | Shurvinton |
| 2003/0117953 A1 | | 6/2003 | Kinahan et al. |
| 2004/0203815 A1 | * | 10/2004 | Shoemake et al. .......... 455/450 |

\* cited by examiner

*Primary Examiner*—Erika A. Gary

(57) ABSTRACT

Managing channel element licenses for base transceiver stations. Preferred methods include license accounting at a BSC or MTS level, thereby providing better utilization of BTS channel element licenses in a wireless communication network. The BTS notifies a license manager whenever a channel element is put into use by transmitting a first channel element utilization message. If the number of available license has been not been exceeded, the license manager transmits a channel element utilization authorization message. If, on the other hand, the number of available license has been exceeded, the license manager transmits a channel element utilization denial message, instruction the BTS to terminate the call setup. Alternative embodiments include the BTS requesting a license using a first channel element utilization message and awaiting authorization prior to utilization of the channel element. The BTS preferably transmits a second channel element utilization message indicating the channel element is no longer in use.

27 Claims, 4 Drawing Sheets

METHOD AND SYSTEM OF POOLING CHANNEL ELEMENTS ON A SWITCH OR OMCR LEVEL

BACKGROUND

A. Field of Invention

The present invention is related to wireless communication systems, and more particularly, to a method and system of managing channel element licenses in a plurality of wireless base stations.

B. Description of Related Art

In a typical wireless communication system, an area is divided geographically into a number of cell sites, each defined by one or more radiation patterns created by an emission of radio frequency (RF) electromagnetic (EM) waves from a respective base transceiver station (BTS) antenna. Similarly, BTS antennae are configured for the reception of EM waves emanating from mobile devices. Each cell site is typically further divided into two, three, or more sectors, where the sectors provide transmit and receive radio coverage for a selected area within the cell site.

Associated with the BTS is a plurality of channel elements for processing individual signal channels. Specifically, in CDMA communication systems, individual communication channels are separable due to their use of channel-specific concatenated coding sequences. In the forward channel, a unique PN code (commonly referred to as a short PN code offset) is used to distinguish channels in a given sector from those in surrounding sectors and cells. Within each sector, channels are further distinguished by yet another code, termed a Walsh code. In an adjacent sector, the Walsh codes may be reused because channel separation is provided by a different offset of the short PN code for that sector. Thus, the number of available forward channels (BTS to MS) on a given carrier frequency in a sector is limited by the number of available Walsh codes. In the ANSI/TIA/EIA-95-B-99 standard entitled "Mobile Station-Base Station Compatibility Standard for Wideband Spread Spectrum Cellular Systems" (published Feb. 1, 1999), the contents of which are incorporated by reference herein, there are sixty-four available Walsh codes, while in CDMA 2000 series (TIA/EIA IS-2000 Series, Rev. A, published Mar. 1, 2000), one hundred twenty-eight Walsh codes are available. Both of the ANSI/TIA/EIA-95-B-99 and the TIA/EIA IS-2000 Series, Rev. A, standards are incorporated herein by reference, and are available from the Telecommunication Industry Association, 2500 Wilson Boulevard, Suite 300, Arlington, Va. 22201.

On the reverse channel, from the mobile to the BTS, a slightly different code concatenation is used. The Walsh codes are used to identify a data symbol alphabet, the short PN code is used for synchronization purposes, and the long code PN code is used to identify the individual mobile channel.

The signal processing on the forward and reverse channels is performed in a channel element (CE) of the BTS. In existing systems, each BTS typically has a bank of CEs that are licensed and available for use on a static basis. Therefore, one disadvantage of existing BTS license schemes is that each BTS must contain enough licensed CEs to carry all of the traffic during the busiest hour of the day. Because not all sites have the same busy hour, the existing license management techniques result in wasted resources, or over-allocation of network resources.

In other situations, existing schemes of CE licensing may be restricted such that CEs are licensed only in blocks of a predetermined size. Specifically, a typical base station channel element card may come with forty-eight physical CE's, of which half may be enabled by default, with the remaining twenty-four CE's being licensed (and thus enabled for use) only in groups of eight. This is inefficient due to the fact that a BTS which requires twenty-five CE's must be upgraded from twenty-four to thirty CE's, rather than just the required tweny-five.

Consequently, a CE licensing system that overcomes these and other limitations is desirable.

SUMMARY

A method of managing channel element (CE) licenses for base transceiver stations is provided. Preferred methods include CE license accounting and management at a Base Station Controller (BSC), Mobile Switching Center (MSC), or Operations Maintenance Center—Radio (OMCR) level, thereby providing better utilization of base transceiver stations (BTS) CE licenses in a wireless communication network. By pooling on a larger level such as by switch or OMCR, fewer CE licenses may be required due to the ability to assign a CE on an as-needed or just-in-time basis.

In a preferred method, the BTS notifies a license manager whenever a CE is put into use by transmitting a first channel element utilization message. If the number of available licenses has been not been exceeded, the license manager transmits a channel element utilization authorization message. If, on the other hand, the number of available license has been exceeded, the license manager transmits a channel element utilization denial message, instructing the BTS to terminate the call setup (or not initiate call setup). This is referred to herein as "just-in-time" dynamic CE licensing.

Alternative embodiments of a preferred method include the BTS requesting a license using a first channel element utilization message and awaiting authorization prior to utilization of the channel element.

A further aspect of some embodiments is that the BTS preferably transmits a second channel element utilization message indicating the channel element is no longer in use.

In an alternative embodiment, the BTS may obtain pre-authorization for one or more CE licenses. In this embodiment, the BTS preferably obtains authorization for one or more CE licenses in advance of an actual need for the CE. This is referred to herein as "prospective"dynamic CE licensing. The BTS then sends a first channel element utilization message indicating a given CE is in use once the CE is actually assigned to a call. The BTS may also send a second channel element utilization message when the call is terminated, indicating the CE is no longer in use.

In further alternative embodiments of prospective dynamic CE licensing, the BTS may obtain additional pre-authorized CE licenses on an as needed basis. The preferred system utilizes "peg" counts to monitor and record the average number of CEs used from the CE pool, the peak number of CEs used, the average number of CEs used on a per BTS basis, and the peak number of CEs used on a per BTS basis.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

A. Wireless Communication System

Figure 1:
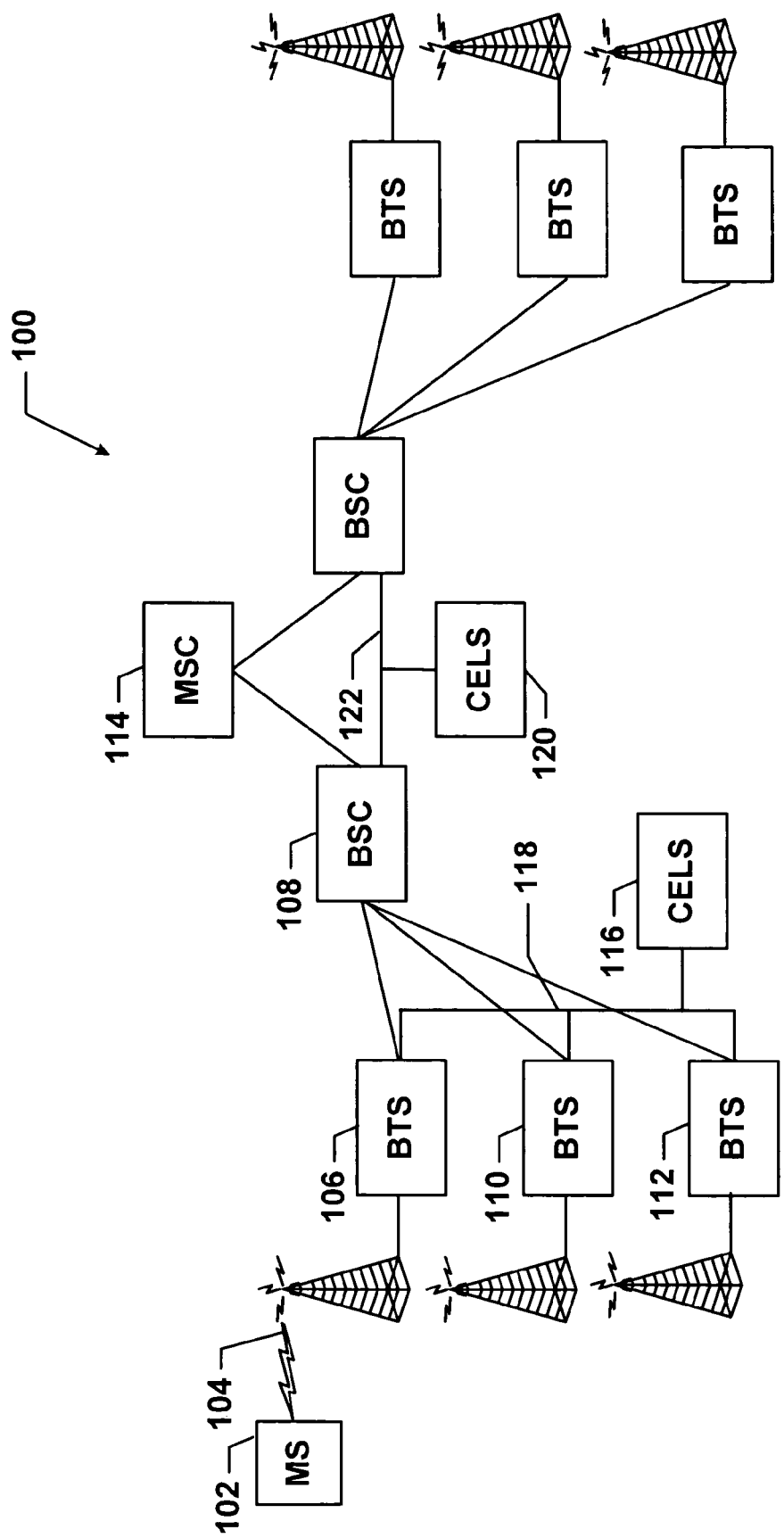
FIG. 1 is a block diagram illustrating one embodiment of a wireless communication system.

In accordance with an exemplary embodiment, a method and system of assigning Quasi-Orthogonal Function codes for use within a wireless communication system is provided. Referring to FIG. 1, a block diagram illustrating one embodiment of a wireless communication system 100 is provided. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include a mobile station (MS) 102 in communication via an air interface 104 with a base transceiver station (BTS) 106, which is coupled to a base station controller (BSC) 108. The BSC 108 is also coupled to a network 114. Mobile stations such as cellular telephones, personal digital assistants (PDA), wireless modems, or other mobile nodes may be used in the wireless communication system 100.

BTS 106 includes one or more antennas arranged to produce radiation patterns defining one or more sectors. Additional BTSs 110 and 112 coupled to BSC 108 are also illustrated. Although three BTSs for each BSC are illustrated within FIG. 1, it will be understood that more or fewer BTSs may be present within the wireless communication system 100.

BSC 108 is an interface between BTSs 106, 110, and 112 and the network 114. BSC 108 also handles radio resource management and radio network management functions for BTSs 106, 110, and 112. The network 114 may be any transport network and/or entity used to route signals to and from the MS 102. For example, network 114 may comprise a mobile switching center (MSC), a packet data service node (PDSN), an Internet protocol (IP) network, the public switched telephone network (PSTN), or any other wireless communication transport network. In addition, network 114 may allow for connectivity to multiple switching platforms, such as a short message service center (SMSC) and an uplink server, for example.

In one embodiment of a preferred channel element license server (CELS), the CELS 116 is connected to BTS stations 106, 110 and 112 via a separate network 118. In an alternative embodiment, the BTS stations 106, 110, and 112 access CELS 120 via the BSC 108 and network 122. In a third embodiment, the CELS 116 and 120 are both present on the network, and coordinate with each other in a hierarchical fashion to manage the CE licenses.

Each of the couplings of the wireless communication system 100, excluding the air interface 104, may be interfaces using various physical, media access, and data link layer technologies, including such technologies as TDM trunks (e.g., trunk level 1 (T1) line), a packet-based link (e.g., IEEE 802.3, gigabit Ethernet line), or other connections.

The wireless communication system 100 may be divided geographically into a number of cell sites. At the core of each cell site is a BTS, such as BTSs 106, 110, and 112, whose antennas define a radio frequency (RF) radiation pattern. Further, each cell site may be divided into a number of sectors, each defined respectively by radiation patterns from directional antenna elements of the cell site's BTS. Each sector typically has a beam width of about 120 degrees. However, sectors can have any desired beam width.

The radiation pattern of each sector in a cell site produces an air interface that defines a respective coverage area, such as air interface 104. When an MS is positioned within such a coverage area, the air interface provides a communication path between the MS and the BTS. And the MS can then communicate through this path with entities on the wireless communication system 100.

In a typical CDMA wireless communication network, a subscriber connects to the base station and the network infrastructure by way of two separate wireless channels—one from the BTS to the MS, typically referred to as the forward channel, and one from the MS to the BTS, or the reverse channel. The signal processing associated with these communication channels is provided by channel elements.

The forward and reverse channels have different formats and utilize different physical and link layer signaling. Each channel in a CDMA system is identified by a number of parameters, including the frequency of the RF carrier, and various PN sequences that are sequentially applied to the data.

In particular, the forward channel uses a long PN code sequence to scramble the data, and a short PN code with a time offset that defines the sector. That is, all forward channels in a given sector use the same PN short code with the same offset. Other sectors may utilize the same short PN code, but with a different offset. In addition, each forward channel in a sector uses a specific PN Walsh code to identify data for a given user. The orthogonality of the Walsh codes separates the user channels within a given sector. In IS 95, there are sixty-four Walsh codes—one is used as a pilot, one (or from one to seven) is used for paging, and one is used for sync, leaving as many as sixty-one Walsh codes for sixty-one forward channels per sector. IN CDMA 2000, 128 Walsh codes are available. In either system, adjacent sectors may use the same set of Walsh codes due to the use of different short PN code offsets in those sectors.

For the reverse channel, the various PN codes are used in a different manner. First, each MS uses the Walsh codes as a symbol alphabet, whereby up to six data bits may be combined and represented by a single Walsh code. The short code is then applied, and is used for synchronization purposes. Finally, the individual user channels are identified by the offset of the long code. More particularly, the specific long code used to identify the MS's channel is made by "masking" the PN long code by a number determined mathematically by the handset's ESN. With over forty days of 1,228,800 chips/second to choose from, there are billions and billions of reverse traffic channels possible. Of course, reverse access channels are associated with each paging channel in the forward direction, which are publicly-defined long code offsets reserved for reverse-direction public traffic such as call originations, registrations, etc. After a BTS recognizes an MS on an access channel, its identity is known and the BTS redirects the MS to a traffic channel where it will use its own natural long code.

Figure 2:
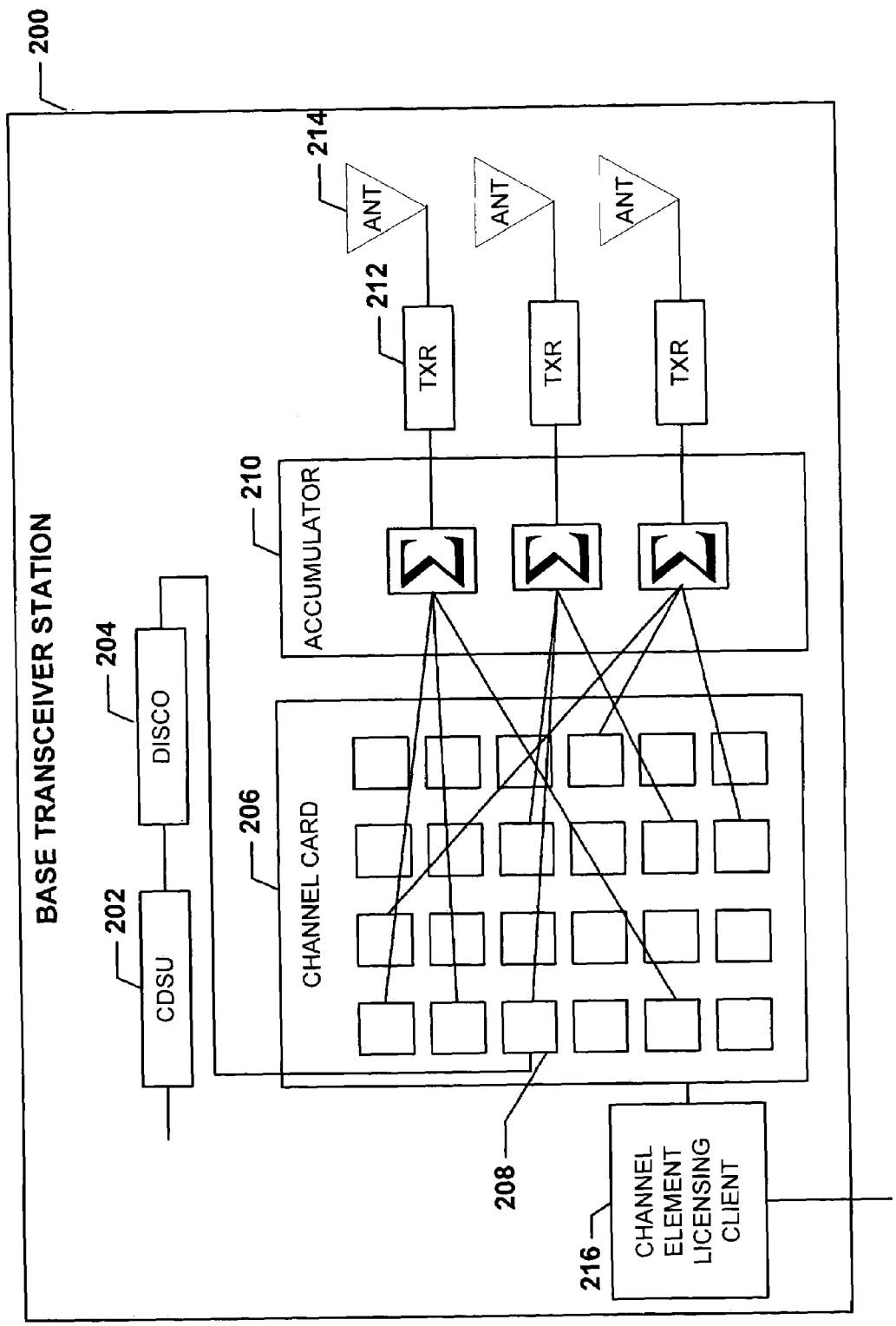
FIG. 2 illustrates a typical BTS architecture.

A typical BTS 200 architecture is shown in FIG. 2. The BTS includes a channel/data service unit CDSU 202 and a DISCO 204. The CDSU provides a communication interface for routing signals from a TDM network (e.g., a T-1 line) to the BTS. The DISCO 204 (DIStribution and COnsolidation unit) provides the communications path and the routing for data packets between various BSC subsystems and the BTSs, and typically routes traffic packets between SBS (soft base station) and BTS subsystems, such as routing the packets to the appropriate CE 208 on the channel element card 206. The outputs of the CEs are summed in accumulator 210, and provided to a corresponding transceiver 212 and RF antenna 214. As shown in FIG. 2, the CEs may be assigned to any channel on one of the available sectors and frequencies provided by the BTS. The BTS also includes a channel element licensing client (CELC) 216 for communicating with the CELS 116 and/or CELS 120.

Figures 3A, 3B:
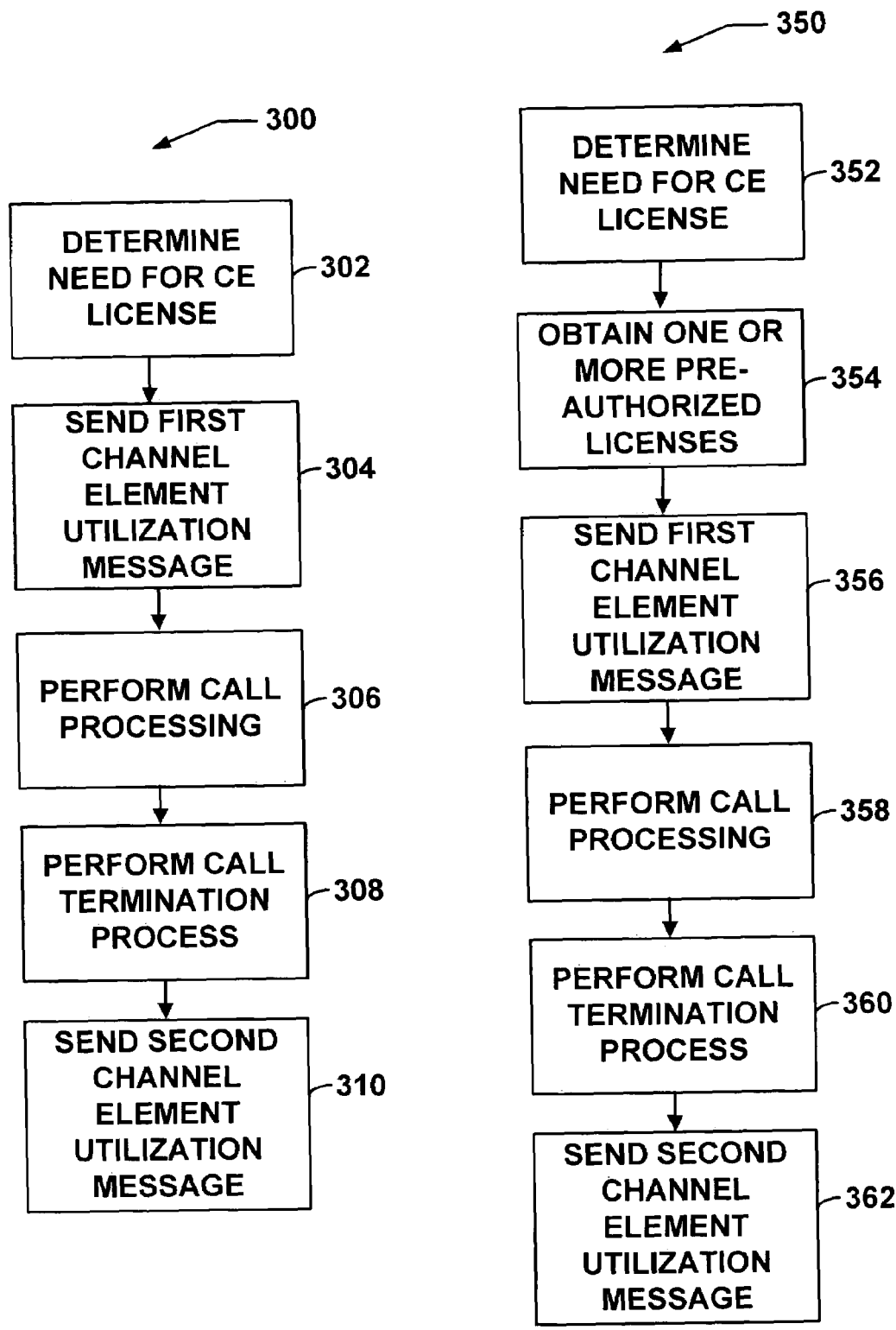
FIGS. 3A and 3B illustrate alternative methods of channel element management.

A preferred method 300 of managing channel element licenses at a base transceiver station is set forth in FIG. 3A. At step 302 the need for a channel element license is determined. In embodiments using just-in-time dynamic licensing, the need for an additional license may arise due to a mobile station requesting a traffic channel assignment to originate a call. The need may also arise due to a call incoming to the mobile 102 from the network 114. In embodiments using prospective dynamic licensing, the need may also arise due to the utilization of all pre-authorized licenses from an available pool of licenses managed by CELC 216. This is shown explicitly in FIG. 3B, step 354.

At step 304, the BTS sends a first channel element utilization message. The first channel element utilization message may be a license request indicating that the BTS desires to utilize a CE. In this embodiment, the BTS may require a response prior to beginning (or completing) a call setup process, as depicted by step 306. The response message is referred to herein as a channel element authorization message. In the case of prospective dynamic licensing, the first channel element utilization message may simply be an accounting message indicating that a channel element has been put into service.

At step 308, a call termination process is initiated, which is a standard process to initiate call teardown to free up network resources. This is followed by step 310, which is to send a second channel element utilization message indicating the channel element is no longer in use.

The first and second channel element utilization messages are transmitted to a CELS 116 or 120, depending the configuration being utilized. That is, in embodiments where the CELS is accessible directly by the BTS, the messages are preferably sent directly to the CELS 116. In alternative configurations, the messages are sent to the BSC for forwarding to the CELS 120.

The location of the CELS is preferably on a dedicated platform, which is accessible to each BTS in the network. In an alternative preferred embodiment, the base station controller (BSC) includes the channel element license server functionality.

Figure 4:
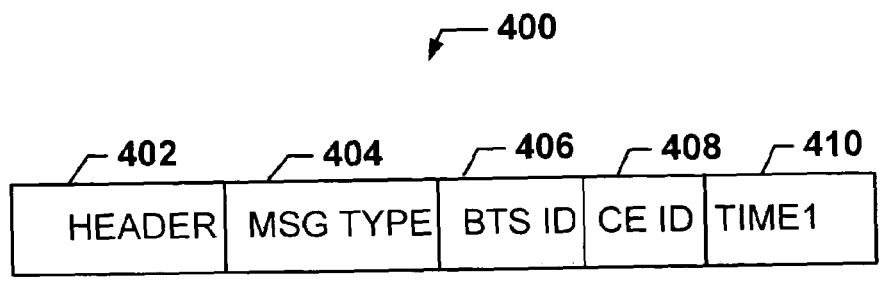
FIG. 4 is one preferred embodiment of a first and second channel element utilization message.

The preferred format of the first channel element utilization message is depicted in FIG. 4. The message includes a header field 402, a message type field 404, a base transceiver station ID field 406, a channel element ID field 408, and a time stamp field 410. The channel element utilization messages may be formatted according to the well-known simple network management protocol (SNMP) or may be formatted in any one of a number of standardized protocols or a proprietary protocol, which may or may not involve the TCP/IP suite of protocols. One such alternative is to provide text-based field delimiters in an XML format, which may then be enacapsulated in TCP or UDP packets for transmission over the IP protocol.

The same message format may be used for the first channel element utilization message (whether it is a request message or accounting message), the second channel element utilization message, the channel element authorization message and the channel element denial message. The type of message may be specified according to a value of the message type field 404.

In one preferred embodiment, the second channel utilization message, which indicates that the CE is no longer in use, is interpreted as a relinquishment of the CE license. In order for the BTS to utilize another CE, it must request another license to be issued by the CELM 116/120. In such an embodiment, the BTS may be configured to delay the transmission of the second channel element utilization message in case the need for another CE arises. The delay may be a predetermined time after performing the call termination process, and it may be dynamically adjusted in response to an average call loading rate or other suitable BTS CE utilization statistics.

Figures 5A, 5B:
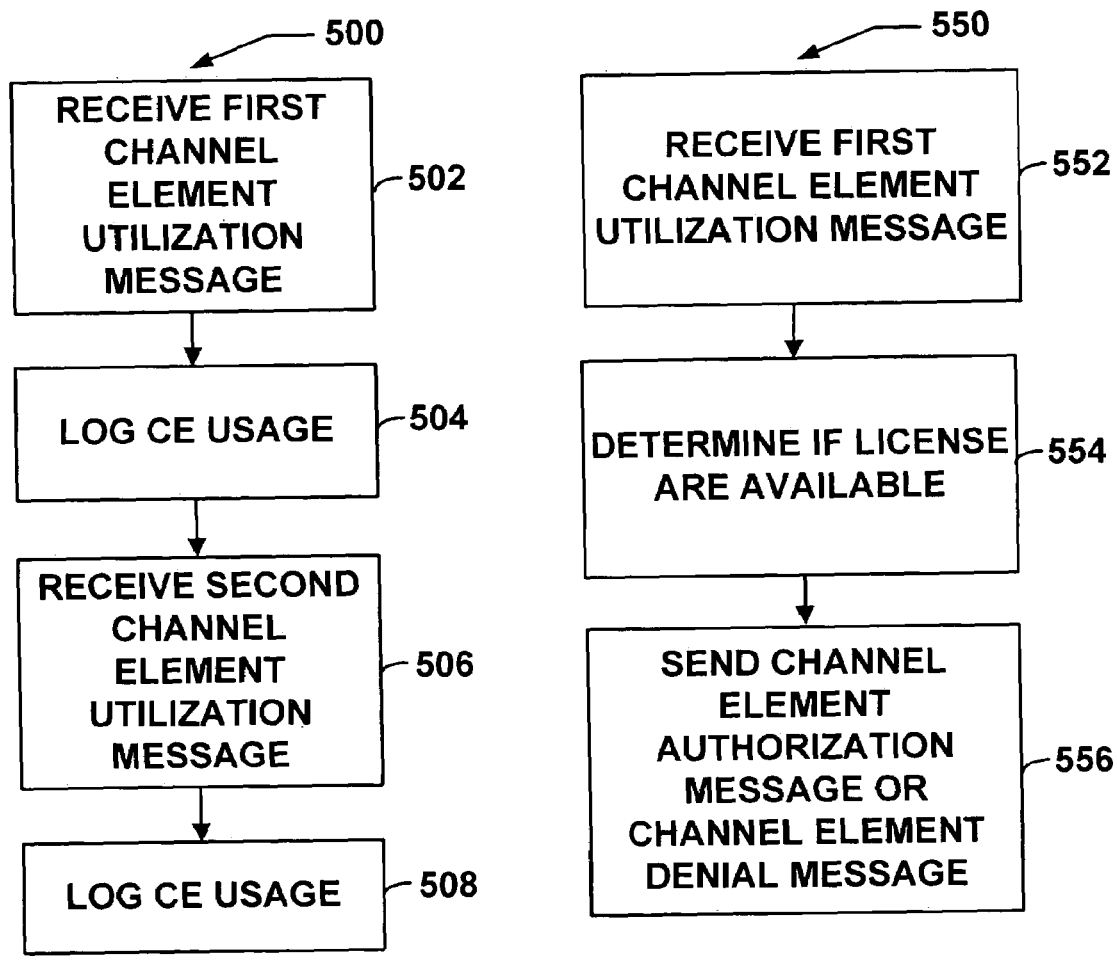
FIGS. 5A and 5B are preferred channel element license server methods.

The CELSs 116 and 120, when serving in the prospective dynamic licensing mode, perform the following steps of method 500, as shown in FIG. 5A. At step 502, the CELS receives a first channel element utilization message. The message may indicate that a pre-authorized channel element is in use. The CELS then logs the usage of the CE at step 504, and awaits a second message at step 506 indicating that the CE is no longer being used. The CELS also preferably logs that activity at step 508.

In FIG. 5B, an alternative CELS method 550 associated with just-in-time dynamic CE license management is shown. At step 552, a request for the issuance of CE license is received. At step 554, the CELS 116/120 determines whether a channel element license is available. Depending on CE license availability, at step 556 the CELS 116/120 sends either a channel element authorization message, or a channel element denial message.

The CELS preferably decrements the number of available channel element licenses in the event a channel element utilization authorization message is sent. In the event that a sufficient number of channel element licenses are not available, then the CELS (or CELC) may determine whether channel elements presently allocated for call processing channels may be reassigned. If so, the CELS may transmit a channel element utilization authorization message in response to the first channel element utilization message, followed by the transmission of a channel element utilization denial message identifying a channel element allocated for call processing channels.

D. Other Examples

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of managing channel element licenses at a base transceiver station comprising the steps of:
   determining a need for a channel element license;
   sending a first channel element utilization message from a base transceiver station indicating a channel element is in use;
   performing call processing;
   performing a call termination process;
   sending a second channel element utilization message from a base transceiver station indicating the channel element is no longer in use.

2. The method of claim 1 wherein the first channel element utilization message is transmitted to a base station controller.

3. The method of claim 2 wherein the base station controller transmits the first channel element utilization message to a license manager.

4. The method of claim 1 wherein the first channel element utilization message is transmitted directly to a license server.

5. The method of claim 1 wherein the first channel element utilization message includes a base transceiver station ID.

6. The method of claim 1 wherein the first channel element utilization message includes a channel element ID.

7. The method of claim 1 wherein the first channel element utilization message comprises a license request message.

8. The method of claim 7 further comprising:
   receiving a channel element utilization authorization message.

9. The method of claim 8 wherein the step of performing call processing is performed only after the step of receiving a channel element utilization authorization message.

10. The method of claim 7 further comprising:
    receiving a channel element utilization denial message; and
    responsively terminating the call processing.

11. The method of claim 1 wherein the second channel element utilization message is sent after a predetermined time after performing the call termination process.

12. The method of claim 1 wherein the second channel element utilization message includes a base transceiver station ID.

13. The method of claim 1 wherein the second channel element utilization message includes a channel element ID.

14. The method of claim 1 wherein the second channel element utilization message includes a timestamp parameter.

15. The method of claim 1 wherein the first and second channel utilization messages are formatted using SNMP protocol.

16. The method of claim 1 wherein the first and second channel utilization messages are formatted using XML protocol.

17. The method of claim 1 wherein the step of determining a need for a channel element license is performed in response to a call origination request.

18. The method of claim 1 wherein the step of determining a need for a channel element license comprises determining whether all pre-authorized licenses have been utilized.

19. A method of managing channel element licenses at a base transceiver station comprising the steps of:
    receiving a first channel element utilization message indicating that a channel element is in use;
    determining whether a sufficient number of channel element licenses are available to allow utilization of a channel element, and if so, decrementing the number of available channel element licenses and transmitting a channel element utilization authorization message.

20. The method of claim 19 wherein a total number of channel element licenses is configured for each of a plurality of base station controllers.

21. The method of claim 19 wherein a total number of channel element licenses is configured for a switch.

22. The method of claim 19 further comprising the step of receiving a second channel element utilization message indicating the channel element is no longer in use.

23. The method of claim 19 wherein the channel element utilization authorization message and the channel element utilization denial message are formatted using SNMP protocol.

24. The method of claim 19 wherein the channel element utilization authorization message and the channel element utilization denial message are formatted using XML protocol.

25. The method of claim 19 further comprising:
    if a sufficient number of channel element licenses are not available, then transmitting a channel element utilization denial message.

26. The method of claim 19 further comprising:
    if a sufficient number of channel element licenses are not available, then:
        determining whether channel elements presently allocated for call processing channels may be reassigned, and if so,
            transmitting a channel element utilization authorization message in response to the first channel element utilization message;
            transmitting a channel element utilization denial message identifying a channel element allocated for call processing channels.

27. The method of claim 26 wherein the channel elements presently allocated for call processing channels are overhead channel group redundancy channel elements.

* * * * *